Feb. 5, 1935.   J. C. DRADER   1,989,792
AUTOMATIC MACHINE TOOL
Filed Feb. 24, 1930   8 Sheets-Sheet 1

INVENTOR
Joseph C. Drader.
BY
Rector, Hibben, Davis, & Macauley
ATTORNEYS.

Feb. 5, 1935.                J. C. DRADER                 1,989,792
                        AUTOMATIC MACHINE TOOL
                        Filed Feb. 24, 1930          8 Sheets-Sheet 2
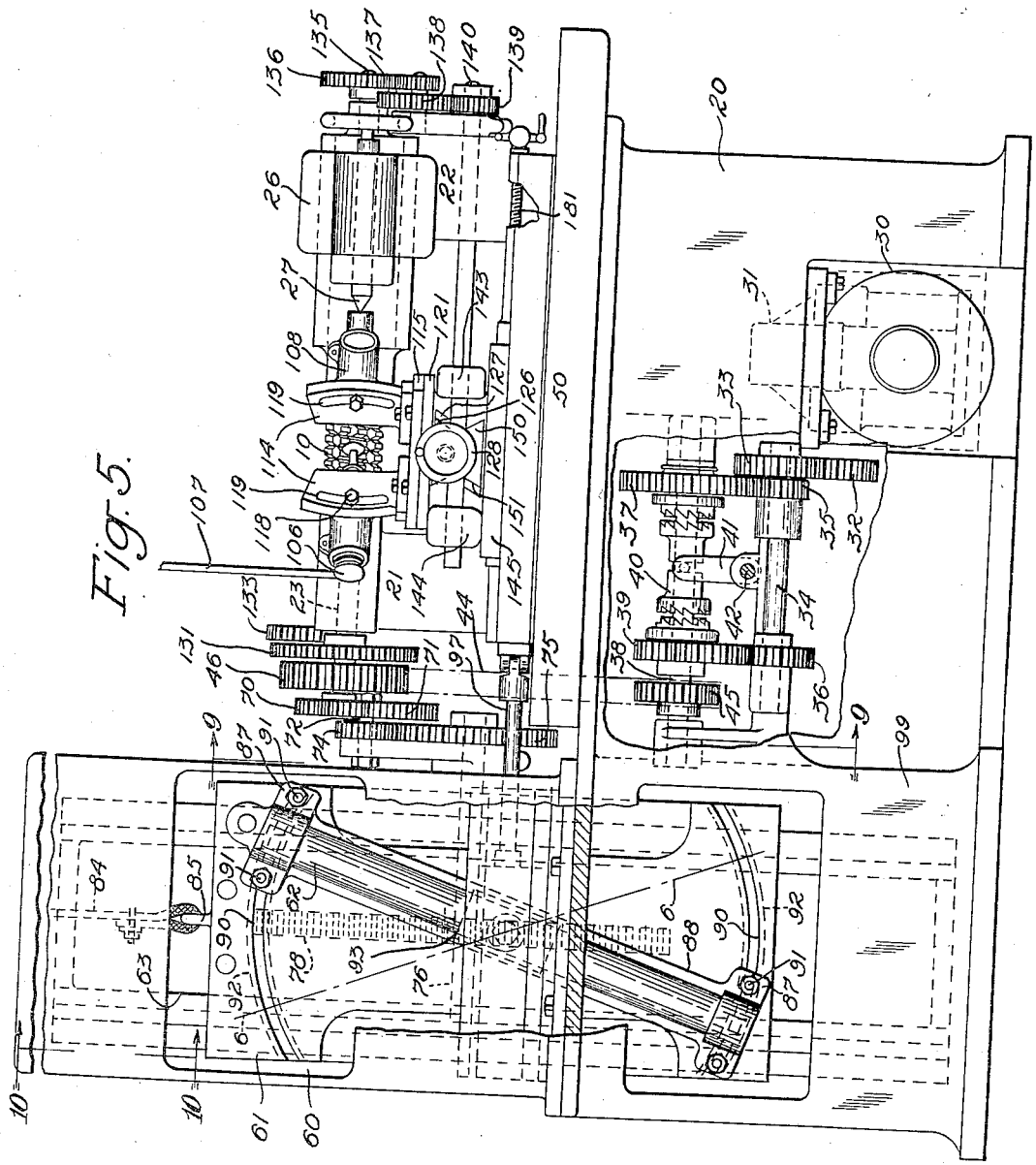
INVENTOR
Joseph C. Drader.
BY
Rector, Hibben, Davis, & Macauley
ATTORNEYS.

Feb. 5, 1935.   J. C. DRADER   1,989,792
AUTOMATIC MACHINE TOOL
Filed Feb. 24, 1930   8 Sheets-Sheet 3
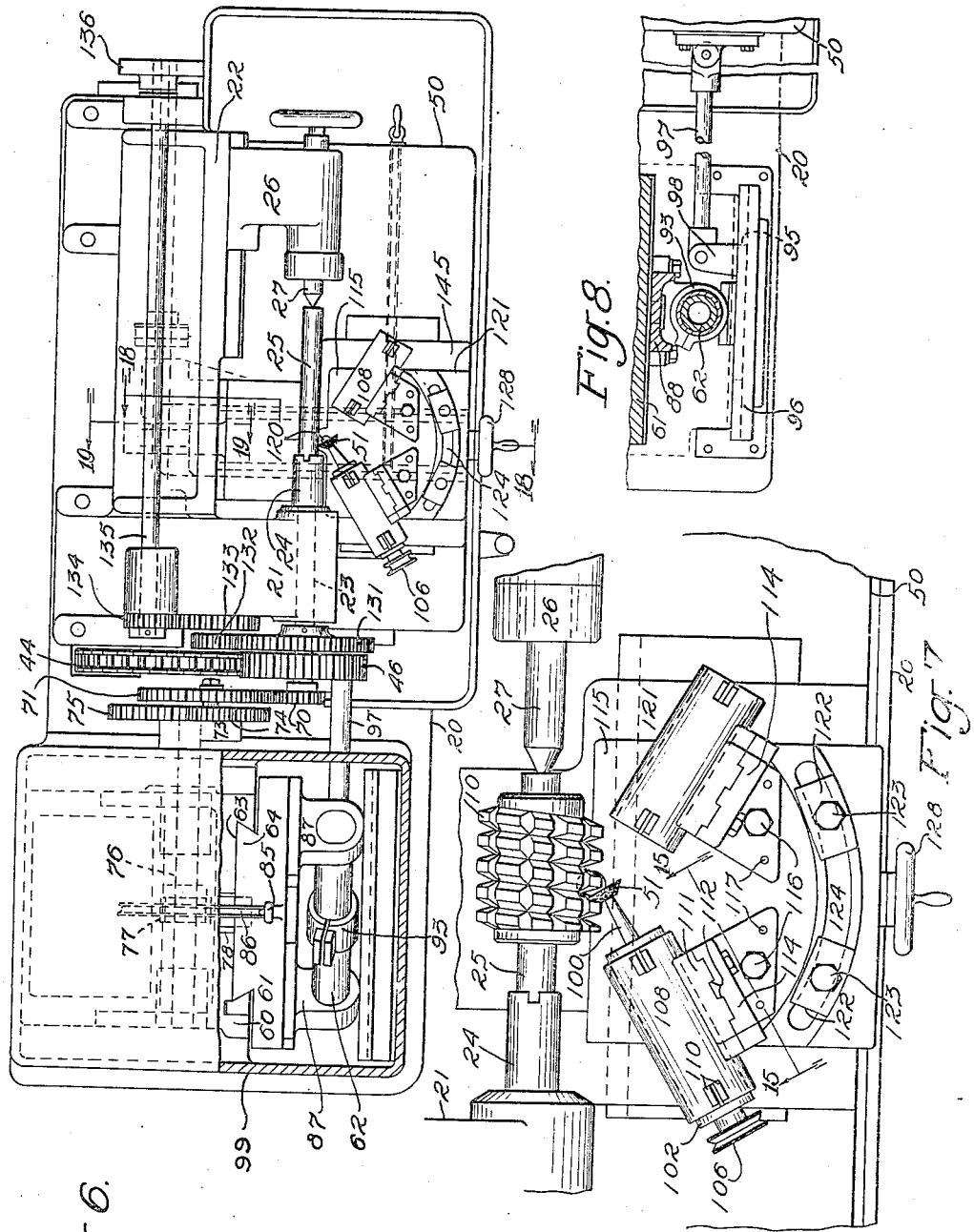
INVENTOR
Joseph C. Drader.
BY
Rector, Hibben, Davis & Macauley
ATTORNEYS.

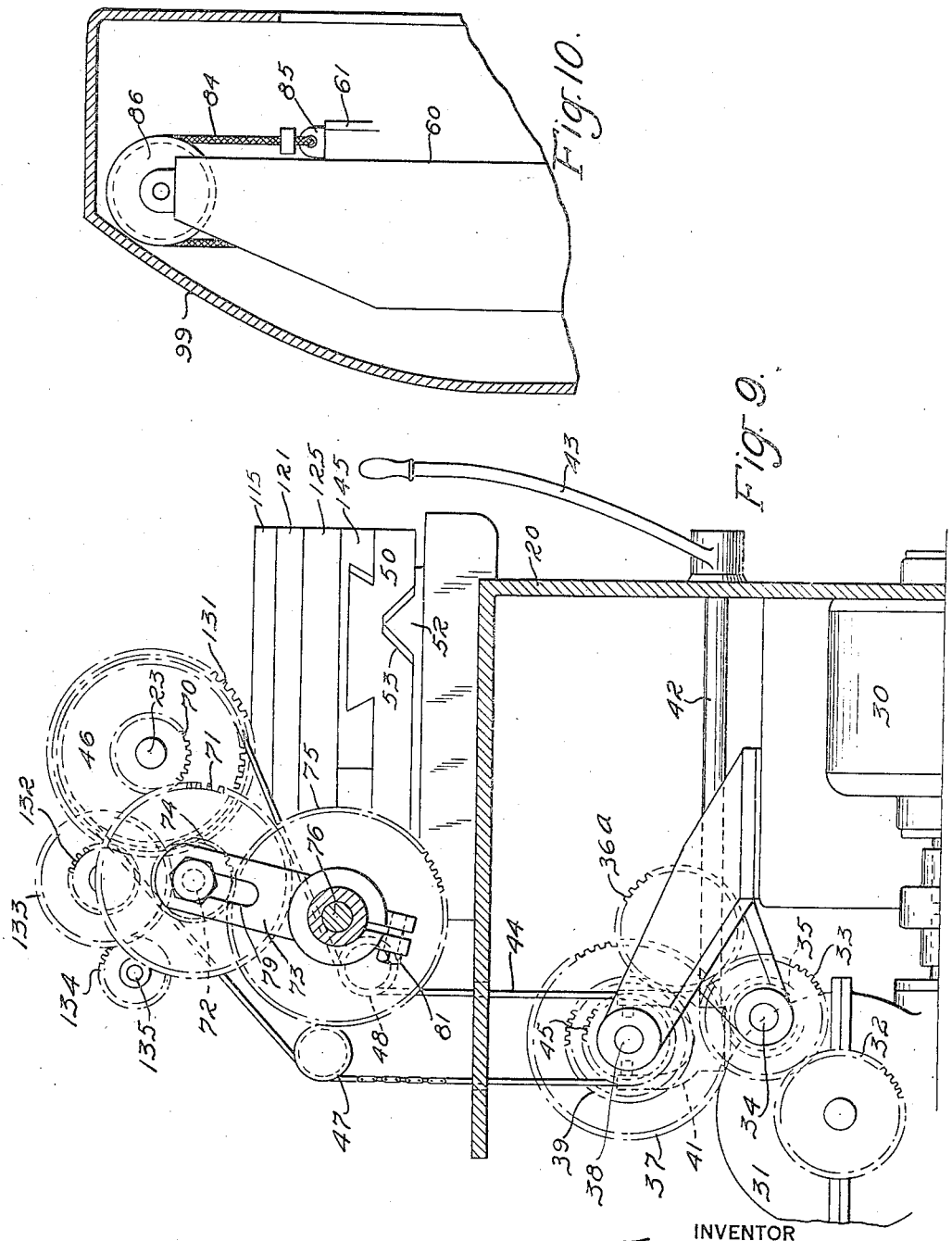

Feb. 5, 1935.                J. C. DRADER                1,989,792
                        AUTOMATIC MACHINE TOOL
                Filed Feb. 24, 1930        8 Sheets-Sheet 5
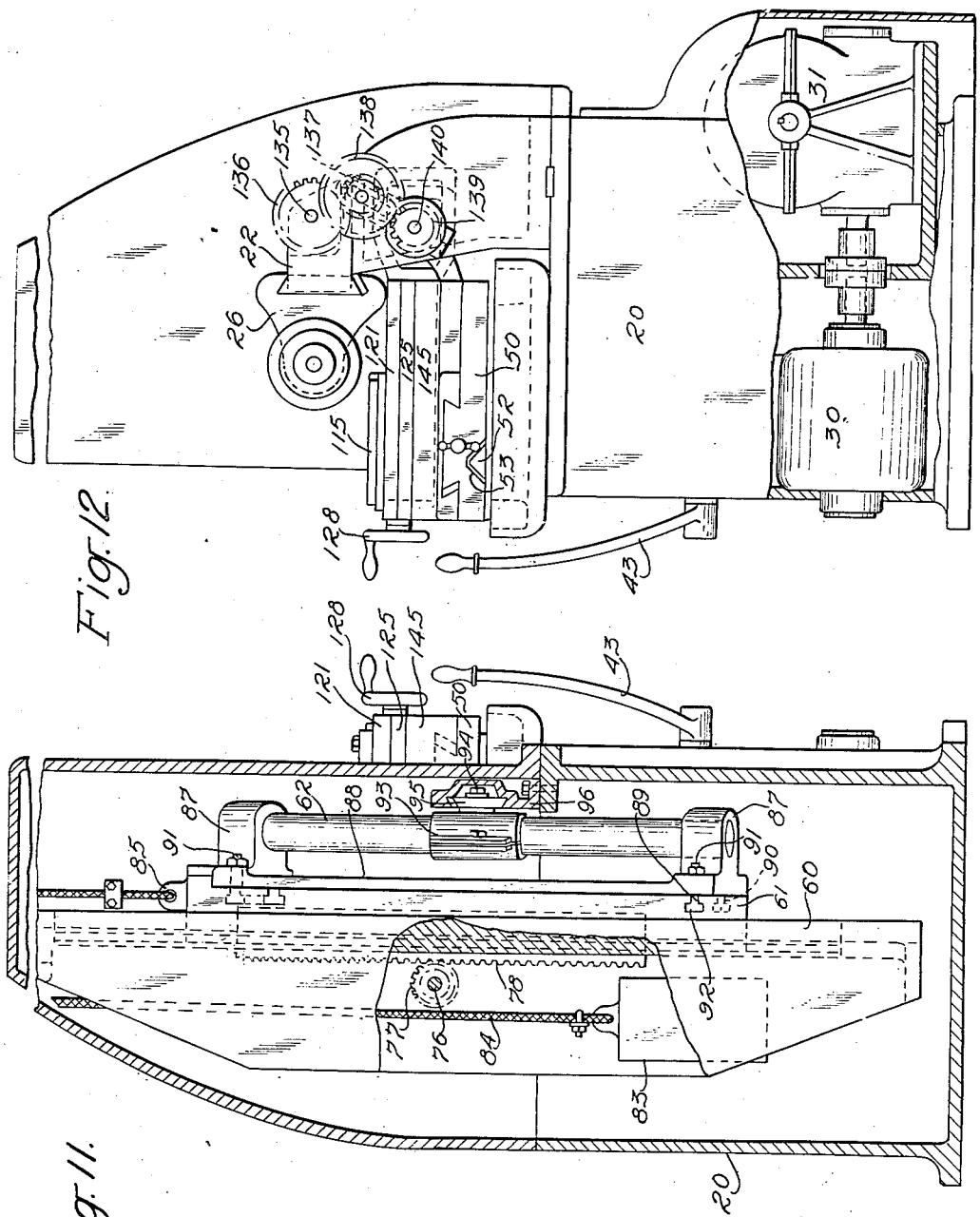
INVENTOR
Joseph C. Drader.
BY
Rector, Hibben, Davis, & Macauley
ATTORNEYS.

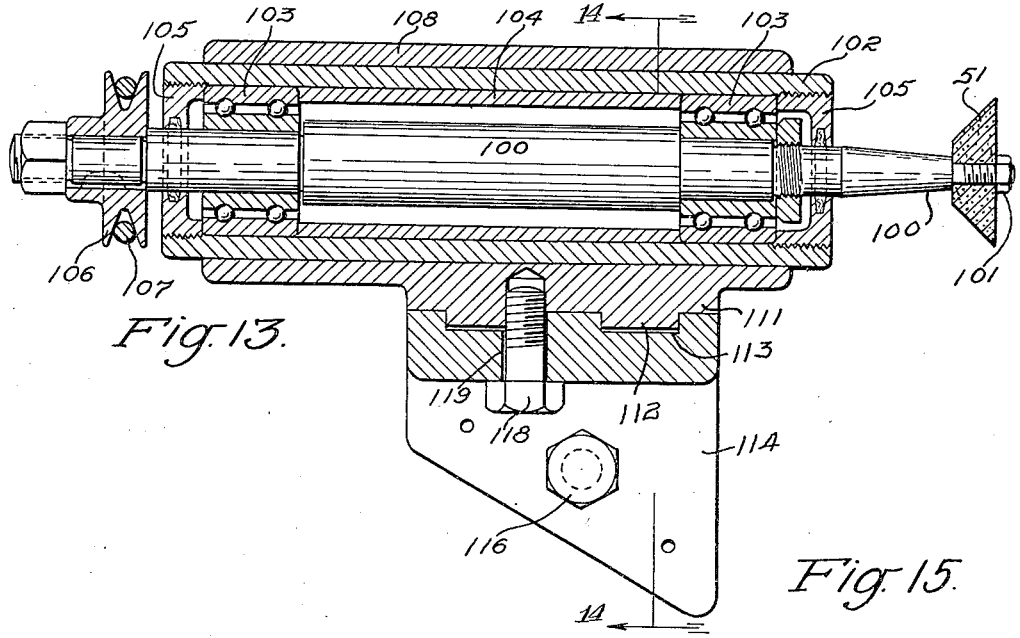
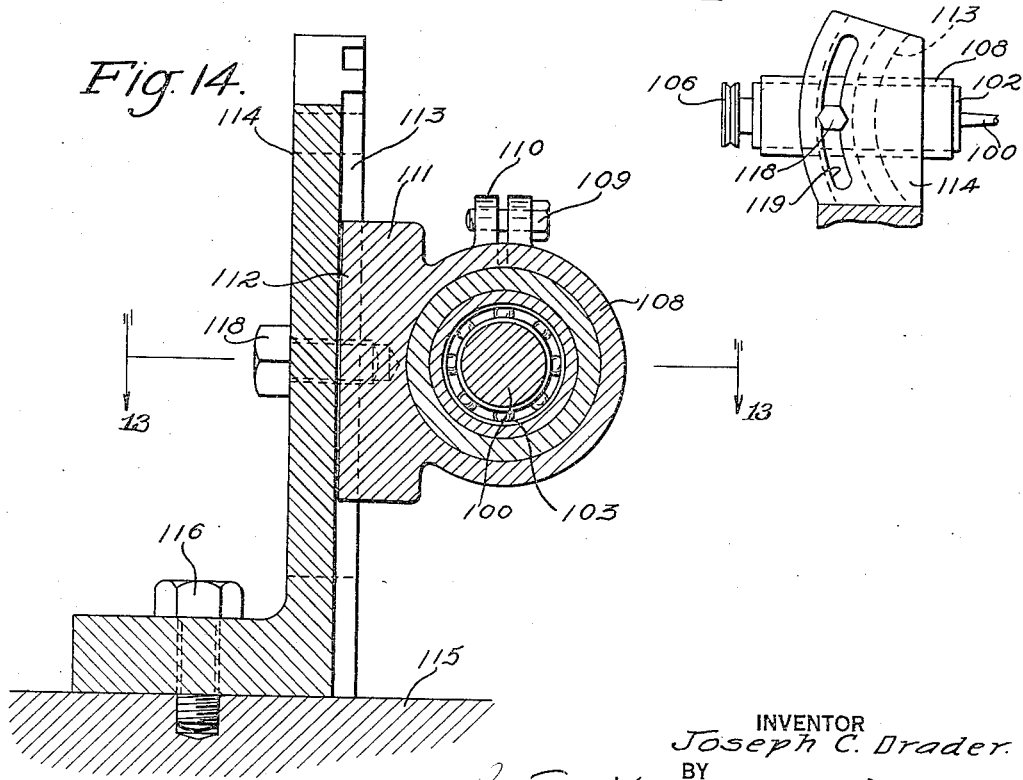

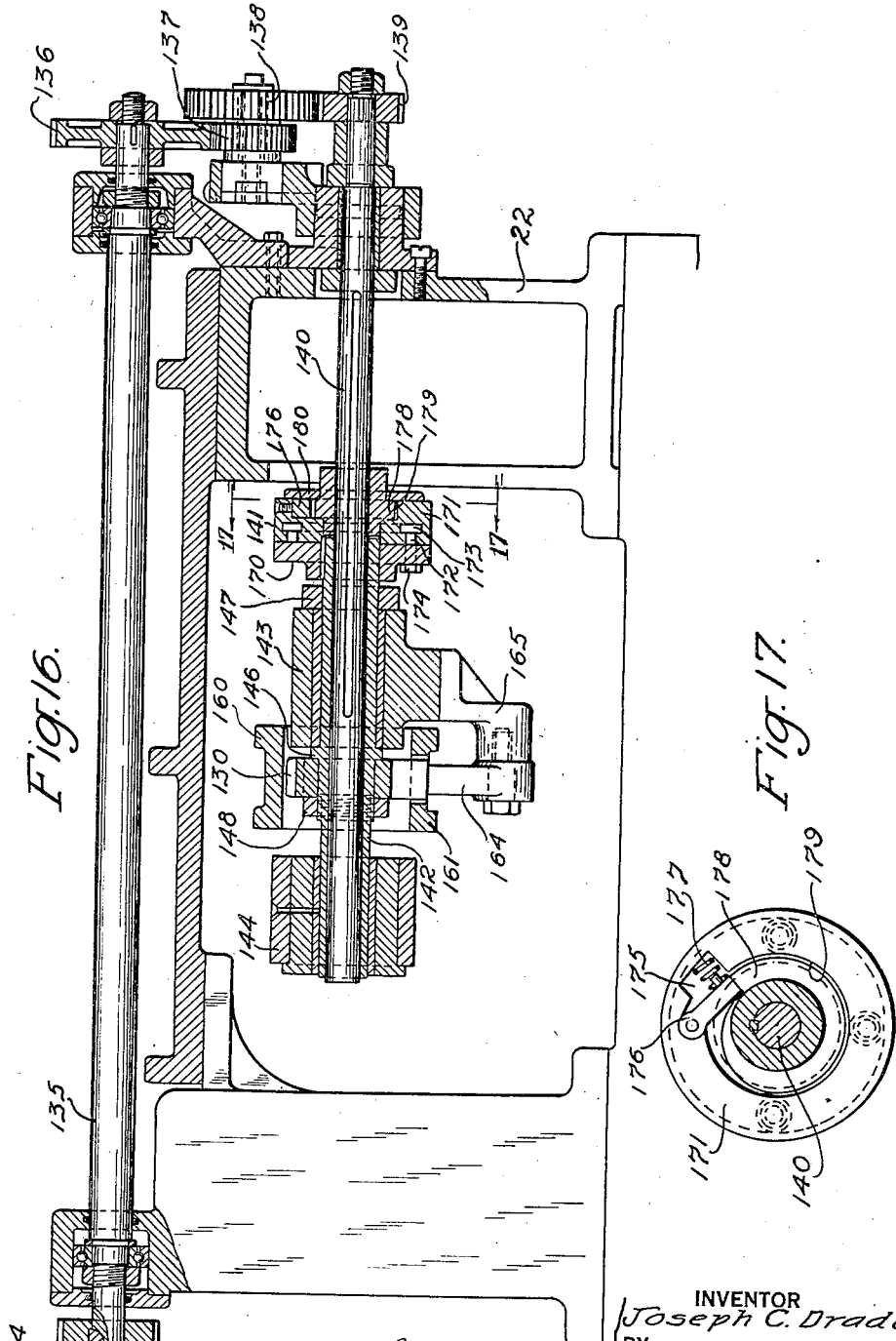

Feb. 5, 1935.  J. C. DRADER  1,989,792
AUTOMATIC MACHINE TOOL
Filed Feb. 24, 1930  8 Sheets-Sheet 8

INVENTOR
Joseph C. Drader.
BY
Rector, Hibben, Davis, & Macauley
ATTORNEYS.

Patented Feb. 5, 1935

1,989,792

UNITED STATES PATENT OFFICE 1,989,792

AUTOMATIC MACHINE TOOL

Joseph C. Drader, Detroit, Mich., assignor to Michigan Tool Company, Detroit, Mich., a corporation of Michigan Application February 24, 1930, Serial No. 430,485

20 Claims. (Cl. 51—56)

This invention relates to an automatic machine tool.

It is directed particularly to a machine for operating upon articles having cutting teeth, screw threads, or other projections formed in a helical path, such, for example, as hobs, taps, milling cutters, worms and the like. It is especially useful for making hobs.

Articles such as hobs must be very accurate. Not only must they be cut accurately, but, after they have been hardened, it is often necessary to grind them to restore their accuracy. Obviously, if these articles must be accurate to a fraction of a thousandth of an inch, the machines in which the articles are made must be correspondingly accurate. Machines operating on articles of this kind must have provision for holding and rotating the article while the instrument operating on the helical teeth must move longitudinally relative to the article. The difficulty with machines hereto available for this purpose is that the relative longitudinal movement between the work and the tool has usually been obtained by means of a lead screw which is operated by a train of gears. It is extremely difficult, if not impossible, to get an absolutely accurate lead screw because the lead screw will be no more accurate than the lathe on which it is made. There is also considerable lost motion in gears used to drive the lead screw.

The teeth of articles such as hobs are usually "relieved" rearwardly of their cutting edges to provide the proper clearance. This requires a relative approaching and receding movement between the tool and the hob. The approaching movement must be a gradual one which takes place while the hob rotates and while a relative longitudinal movement is taking place between the tool and the hob. The receding movement should be sudden in order that the tool may not strike the next tooth that comes into position as the hob rotates. Provision must be made for obtaining these movements automatically and in timed relation to the other movements of the hob and tool.

The present invention has been devised with the object in view of producing an automatic machine that will do the required work with greater accuracy than has heretofore been obtainable. The invention comprehends a simple combination of elements that cooperate to achieve the desired result without the use of a lead screw.

The general object of the invention is, therefore, to provide an improved automatic machine tool for making or operating on hobs, taps, and the like.

A more particular object is to provide an improved automatic hob grinder.

Other objects and advantages of the invention will appear from the following specification and drawings.

An embodiment of the invention is shown in the accompanying drawings, in which:

Fig. 5 is a front elevation of the machine with certain parts thereof broken away to better illustrate the construction.

Fig. 6 is a plan view of the machine with portions broken away to show other parts more clearly.

Fig. 7 is an enlarged fragmentary plan view showing the grinding wheel and work in operative relationship with respect to each other.

Fig. 8 is a fragmentary detail view showing the connections between the tool carriage and the means that moves it longitudinally.

Fig. 9 is a sectional elevation taken on the line 9—9 of Fig. 5.

Fig. 10 is a fragmentary sectional elevation view taken as on the line 10—10 of Fig. 5, showing the means for supporting the counter-balance weight.

Fig. 11 is an end elevation taken from the left hand side as viewed in Fig. 5, the end wall and portions of other parts being broken away to better illustrate the construction.

Fig. 12 is an end elevation of the machine taken from the right as viewed in Fig. 5, portions of the end wall being broken away to better illustrate parts hidden behind the same.

Fig. 13 is an enlarged horizontal sectional view taken centrally through the grinding wheel spindle as on the line 13—13 of Fig. 14.

Fig. 14 is a vertical sectional view taken through the grinding wheel supporting means on the line 14—14 of Fig. 13.

Fig. 15 is a fragmentary sectional view taken on the line 15—15 of Fig. 7.

Fig. 16 is a partial sectional view taken through the cam shaft and cam employed for reciprocating the grinding wheel toward and from the work, said view showing the means for supporting the shafts, and the clutch employed for driving the cam.

Fig. 17 is a vertical sectional view taken on the line 17—17 of Fig. 16 and illustrating the construction of the clutch in the cam shaft line.

While, as pointed out above, the machine is capable of a variety of uses, one of its principal uses is in the grinding of hobs and, in order that the operation of the machine and the marked advantages derived from the novel combination of elements may be clear, the machine will be described as a hob grinder.

Figure 1:
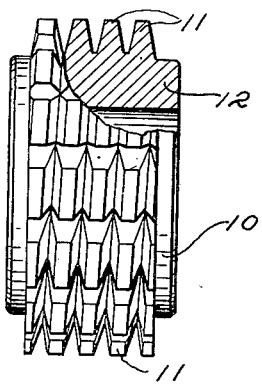
Fig. 1 is a side elevation of a hob such as may be ground in the machine.

A hob 10 to be ground is illustrated in Fig. 1. This hob is provided with a plurality of cutting teeth 11 helically arranged around a cylindrical body 12. The teeth are circumferentially divided from one another by grooves or flutes called "gashes" which grooves may be either straight or spirally arranged to make "straight gashed" or "spirally gashed" hobs. In grinding the hob teeth there must not only be a relative rotative movement between the hob and the tool but there must also be a relative longitudinal movement between the two in order that the tool may follow the helical lead of the teeth. If the hob is to be accurate within very small dimensions the relative longitudinal movement between the tool and hob must be very accurately controlled with relation to the rotative movement.

Figure 2:
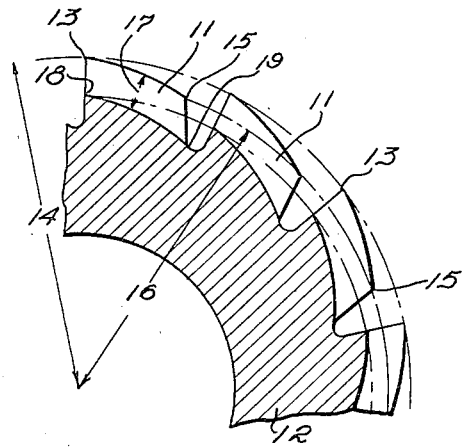
Fig. 2 is a diagrammatic view illustrating the shape of the hob teeth to be ground.

The hob teeth are "relieved" on top to provide clearance as illustrated in Fig. 2. For example, the top cutting edge 13 of any given tooth is at a distance from the center of the hob corresponding to the radius 14 while the rear top edge 15 of the same tooth is at a considerably lesser distance 16 from the center of the hob, the top surface of the tooth sloping gradually from the front to the rear. In order to grind this relief the grinding tool must be moved gradually toward the hob as the hob rotates and, in order that the tool may avoid striking the next tooth, the work and the tool must be separated suddenly after the tool has operated on a given tooth.

Figure 3:
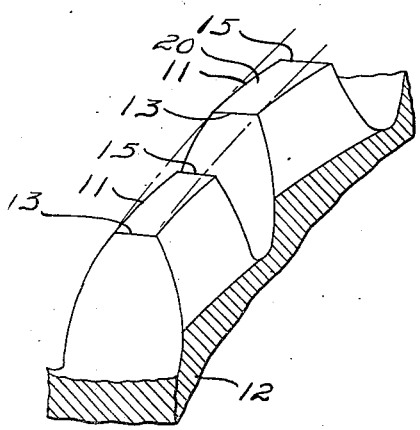
Fig. 3 is a perspective view showing the shape of the hob teeth.
Figure 4:
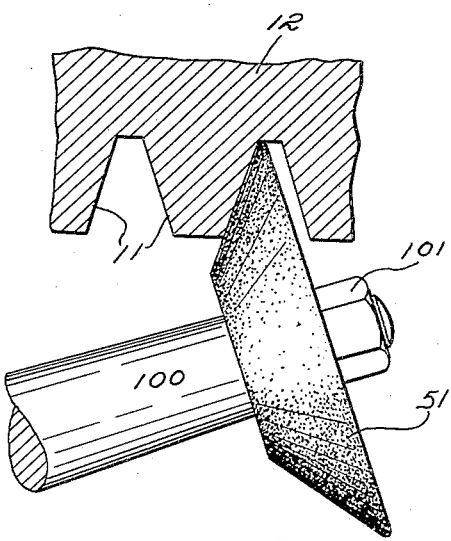
Fig. 4 is a partial section and plan view showing how the grinding wheel is positioned relative to the teeth of the hob.

The distance between the bottom and top of a tooth, that is, the distance 17 in Fig. 2, is maintained substantially the same from the front to the back of each tooth which means that the distance from the center of the hob to the bottom of the groove near the front of a given tooth, as at 18 in Fig. 2, is greater than the distance from the center of the hob to the bottom 19 of the same groove adjacent the rear of the same tooth, the difference being substantially the same as the difference between the radii 14 and 16. The width of the top face 20 of a tooth (Fig. 3) is maintained the same at the front as at the rear and, it will be apparent that, in a hob such as above described, there will be a "relief" or clearance on each side of each hob teeth as well as on top. This is clearly illustrated in the perspective view of Fig. 3 and will be clear from the following: In operating on the side of a tooth the grinding wheel is set to grind the full depth of the tooth at its front. The wheel is either shaped or set so that its grinding surface is inclined to the same inclination as the side of the tooth as shown in Fig. 4. In order to grind the side surface of the tooth to its full depth from front to back, the wheel must be moved inward gradually as the hob rotates because the tooth does not follow a circle whose center is the hob center as will be clear by reference to Fig. 2. As the wheel moves inwardly the effect is as though the inclined face of the wheel were moved sidewise against the tooth to take off more material. The result is that the tooth has a side clearance or "relief" as well as a top "relief". Of course, in practice, the grinding wheel does not take off much more material at the front than at the back because the most of the material is cut away to form the side relief when the hob is cut but, if such material were on the tooth, the wheel would grind it away.

This means that, in operating on the side of a tooth, the wheel must be gradually moved toward the hob and then suddenly withdrawn in order that the wheel may not strike the next tooth.

It is desirable that both sides of the hob teeth be ground and this is generally done by first setting the machine to grind one side of the teeth, running a batch of hobs through, setting the machine to grind the other side of the teeth, and re-running the same batch of hobs through a second time. The teeth are thus "relieved" on both side faces.

Hobs of this kind are used for making gears and this use has become very extensive in the automotive industry where there is a big demand for tools that will make gears rapidly. Along with the increased demand for high speed production of gears has come a corresponding increase in the demand for extremely accurate gears in order to avoid friction losses and to reduce noise. This means that the hobs must be made to extremely close dimensions and be highly accurate because any errors or variations in the sizes of the hobs are multiplied in the gears and inaccurate or noisy gears result.

The hobs are cut to shape after which they are hardened. During the hardening process the teeth are distorted more or less so that in order to have a hob of the required accuracy the teeth must be ground. While the cutting of the hobs must be accurate the grinding must be extremely accurate because the latter operation puts the hob in finished shape.

In order to make hobs rapidly and economically the cutting and grinding operations must be automatic. Automatic machines have heretofore been produced which will give the desired relative movements between the tool and the work. If a lead screw is used the accuracy of the machine will depend to a very large extent upon the accuracy of the lead screw. The lead screw must have been made in a lathe and hence the accuracy of the lead screw depends upon the accuracy of the gears and lead screw of the lathe, which, in turn, depends for its accuracy upon the accuracy of the gears and lead screw of a preceding lathe, etc. It is extremely difficult, if not impossible, to get absolutely accurate lead screws. The making of such screws is fairly complicated and machines on which they are made are rarely accurate enough to produce lead screws of the required accuracy for hob grinding. The present invention has been devised to avoid this difficulty.

The machine is provided with a base or frame 20 which supports the various parts of the machine and which parts, for purposes of description, will be grouped as follows: (1) the work support; (2) the tool carriage; (3) to lead bar carriage; (4) the tool support; and (5) the reciprocating mechanism for the tool. These groups of mechanisms will be taken up in order and then the manner in which they cooperate will be explained.

Work support

The hob 10 is rotatably supported on the machine base 20 and, for this purpose, the base is provided with two upwardly-extending heads 21 and 22 (Fig. 5) which are positioned toward the rear of the machine (see Fig. 12) in order that the tool carriage may be positioned at the front so as to locate the tool in convenient position for the operator.

The main head 21 supports a work shaft or spindle 23 that is driven through mechanism that will be described later. The right hand end of this shaft, as viewed from the front of the machine, has an enlarged portion 24 (Fig. 7) for centering and driving an arbor 25 that carries the hob 10.

The head 22 slidably supports a tail stock 26 (Fig. 12) having a centering device 27 (Fig. 5) of usual construction for supporting the right hand end of the arbor 25. This tail stock may be locked in various adjusted positions on the head 22 in any convenient manner, no means for this purpose having been shown as many conventional constructions are well known, any one of which can be employed.

The work spindle 23 is driven by an electric motor 30 whose power is transmitted to the spindle through a speed reduction device and a reversing clutch as follows:

The motor 30 is connected to a speed reduction device 31 of any suitable type which device drives a gear 32 (Fig. 5). The gear 32 meshes with a gear 33 fixed to a shaft 34 to which are secured two pinions 35 and 36. The pinion 35 meshes with a clutch gear 37 journaled loosely on a shaft 38 and gear 36 drives a similar gear 39 on shaft 38, the drive in the latter case being through an intermediate gear 36ª (Fig. 9). The clutch gears can be selectively clutched to the shaft 38 under the control of a toothed sliding member 40 (Fig. 5) mounted on the shaft 38 and controlled in its sliding movement by a yoke 41 (Fig. 9) connected to a shaft 42 that can be oscillated by a hand lever 43 positioned for convenient manipulation at the front of the machine as illustrated in Fig. 12. The minor details of the clutch have not been illustrated and described as any suitable and well known form of reversing clutch can be used.

The shaft 38 drives the work spindle 23 through a chain belt 44 that passes around a sprocket wheel 45 on the shaft 38 and over a sprocket 46 on the work spindle. The chain belt also passes over idler pulleys 47 and 48 (Fig. 9) in order to clear certain parts of the machine.

From the description thus far given it will be noted that the machine is provided with a work support for rotatively supporting a hob on the machine base, the work being rotated by means of an electric motor operating through a reversing clutch by means of which the direction of rotation of the hob can be reversed. The drive is positive, that is, the gears mesh with one another and the chain belt meshes with its sprockets.

"Tool" carriage

Mounted to slide longitudinally on the base of the machine is a carriage 50 supporting a tool comprising a grinding wheel 51. For convenience in description this carriage will be referred to as the "tool carriage" it being understood that the term "tool" includes a grinding wheel, a cutting device, a measuring instrument or any other device for operating on the work.

The tool carriage is mounted to slide longitudinally at the front of the machine as illustrated in Fig. 12 so that it will be in a convenient position for the operator. The machine base 20 is provided with a rib 52 fitting into a groove 53 in carriage 50 to properly guide the carriage in its sliding movements.

The tool carriage is moved longitudinally by a second carriage which will now be described in order that the movements of the tool carriage may be clear.

"Lead bar" carriage

At the left of the machine, as viewed from the front (Fig. 5), is a frame 60 that supports and guides a table or carriage 61 on which is mounted a "lead bar" 62, the function of which will presently appear. For purposes of convenience in description the carriage 61 will be called the "lead bar carriage".

The lead bar carriage is mounted for movement in a path at right angles to the path of movement of the horizontally slidable tool carriage 50, the frame 60 being provided with an undercut groove 63 (Fig. 6) in which fits a complementary rib 64. In the embodiment of the invention illustrated, the carriage 61 moves up and down in a vertical plane. This vertical movement is preferred although the carriage could be moved in a horizontal or in an inclined plane if desired.

The lead bar carriage is driven from the work spindle 23 in order that the carriage may move in timed relation to the spindle. Fixed to the spindle 23 immediately to the left of the sprocket 46 (Fig. 5) is a gear 70 that meshes with a gear 71 (Fig. 9) journaled on a stub shaft 72 adjustably secured to an arm 73. Secured to and rotating with the gear 71 is a smaller gear 74 that meshes with a larger gear 75 secured to a shaft 76 that extends to the left as shown in Fig. 5. This shaft carries a pinion 77 (Fig. 11) meshing with a rack 78 on the lead bar carriage. The lead bar carriage is thus positively driven through a train of reduction gears from the work spindle.

It should be observed that the number of gears used is much smaller than usual, a condition that is made possible by the elimination of lead screws that would require greater speed reduction. The smaller number of gears makes the drive more direct and tends to eliminate lost motion. Another advantage of the drive is that a rack, such as rack 78 can be made much more accurate than a driving gear. The driving contact between the last gear and the lead bar carriage is therefore a very accurate one.

The speed with which the lead bar carriage is moved can be changed by changing the gears 74 and 75 (Fig. 9). The stub shaft 72 on which gear 74 is journaled can be adjusted in a slot 79 in arm 73 and the arm itself can be swung on the axis of shaft 76. For the latter purpose the lower end of arm 73 is made in the form of a split collar that may be adjustably clamped by a bolt 81 to a stationary sleeve 82 surrounding shaft 76. The speed can also be varied by changing gears 70 and 71.

The lead bar carriage is counterbalanced by a weight 83 (Fig. 11) attached to one end of a cable 84 whose other end is connected to an eye 85 on the carriage, the cable being passed over a pulley 86 (Fig. 10). This not only relieves the driving connections between the work spindle and the lead bar carriage of stresses that might otherwise be set up tending to introduce error, but the counterbalance is of substantially greater weight than the lead bar carriage with the result that it takes up any lost motion in the driving gears and keeps them in tight engagement at all times. The driving gears act positively to lower the carriage against the action of the counterweight.

The lead bar 62 is a cylindrical bar of relatively large diameter to enable it to withstand, with substantially no deflection, any forces that may tend to bend it. This bar is mounted on the lead bar carriage so as to be adjustable about a center to different angular positions. One of these positions is shown in Fig. 5, and, in the machine illustrated, the lead bar may be adjusted from its Fig. 5 position to a position substantially coincident with the line 6—6 of Fig. 5 and to any intermediate position. The center about which the lead bar is adjusted is on the axis of the connections between the lead bar and the tool carriage, which connections will be explained presently.

The ends of the lead bar 62 are received within supporting brackets 87 (Fig. 11) on the ends of the longitudinal supporting member 88. This member has arcuate tongues 89 (Fig. 11) on its bottom which are slidably received in arcuate slots 90 in the face of the lead bar carriage 61. The arcuate slots 90 have a common center substantially coincident with the center of the lead bar carriage. The lead bar may be held in any adjusted position by means of bolts 91 that extend through the ends of the supporting member 88, the heads of the bolts being slidably received in the undercut portions 92 of the arcuate slots 90. When the nuts on the bolts are tightened the lead bar supporting member is securely held to the lead bar carriage.

The lead bar moves the tool carriage longitudinally through direct connections as follows:

Surrounding the lead bar 62 is a sleeve 93 closely fitting the lead bar but slidable thereon, the sleeve being relatively wide and being accurately made so there is no chance for it to wabble or move relative to the lead bar except as it slides along said bar. This sleeve is securely held by a bolt 94 (Fig. 11) to a slide 95 which moves in a horizontal stationary guide 96 carried by the frame of the machine. The slide 95 serves to hold the sleeve 93 against vertical movement, to guide it accurately as it moves in a horizontal direction, and to prevent the sleeve from biting into the lead bar.

The sleeve 93 is directly connected to the tool carriage 50 by a rod 97 (Fig. 8), one end of which is pivoted to a bracket on the carriage 50 and the other end of which is pivoted to a lug 98 on slide 95. The two pivots are at right angles so as to give a universal joint effect. The tool carriage thus moves with the sleeve and in direct proportion to the movement of the lead bar.

A straight lead bar such as shown can be made very accurate as its manufacture does not involve cutting threads on it nor does its accuracy depend upon the accuracy of a lead screw in a lathe. By mounting it as shown, a very fine degree of adjustment can be obtained. The connection between it and the tool bar carriage is a rigid direct connection without any lost motion and hence the tool carriage will move absolutely accurately with relation to the lead bar.

Although a series of driving gears is used between the work spindle and the lead bar carriage, the number of gears used has been greatly reduced as compared with the number ordinarily employed and, because of the improved combination of elements used for obtaining relative movements of the machine parts, any tendency to error due to lost motion in the gears is eliminated. The counterweight 83 constitutes a means for taking up any lost motion that may be present and keeps the gears tightly engaged in one direction. This means can be used for this purpose only because of the novel combination of elements making up the machine, it being evident that a counterweight could not be effectively used with an ordinary lead screw machine as the lead screw would prevent the weight from pulling the gears tightly together.

From the description thus far given it will be apparent that the tool carriage is moved longitudinally in timed relation to the rotation of the work spindle; that this movement is obtained through the action of a lead bar on a carriage that moves transversely to the path of movement of the tool carriage, and that the movement is obtained by mechanism in which lost motion is eliminated and which can be made much more accurately than it is possible to make lead screws.

While the tool carriage is the part that is made longitudinally movable in the machine shown it is evident that the tool carriage could be stationary and the work support could be moved longitudinally relative to it by means of the lead bar. The invention comprehends a relative longitudinal movement between the work support and tool carriage no matter which one moves.

The lead bar carriage could be made to move horizontally instead of vertically, but the vertical movement is preferred as it enables the structure to be made more compact, the guideways tend to be self-cleaning, and the structure can be enclosed in a housing 99.

Grinding wheel support

When a tool such as the grinding wheel is used provision must be made for rapidly rotating it and, in addition, it must be adjustable both vertically and horizontally in order that the surface of the wheel can be properly positioned relative to the teeth to be ground.

The grinding wheel 51 comprises a small truncated-cone-shaped wheel such as illustrated in Fig. 13, the exact shape of the wheel being varied to suit the requirements of the work to be ground. The wheel is clamped to the end of a spindle 100 by means of a bolt 101 and this spindle is suitably journaled in a sleeve 102. As shown in Fig. 13 the spindle is carried by two ball bearings 103 held in position against a spacing sleeve 104 by threaded collars 105.

The grinding wheel is driven by a pulley 106 fixed to the end of the spindle 100 on the end opposite to that carrying the grinding wheel. The pulley 106 is driven by a belt 107 that passes over an overhead pulley or drum not shown.

The grinding wheel spindle 100 with its grinding wheel 101 and pulley 106, together with the sleeve 102 in which the spindle is mounted, constitute a compact tool unit and this unit is detachably held in position by a split clamping sleeve 108 (Fig. 14). The two parts of this sleeve may be clamped about the tool unit by means of a bolt 109 passing through ears 110 that project from the respective portions of the clamping sleeve. This type of mounting permits the tool unit to be quickly fixed in position and equally as quickly removed for replacement, repairs, or the substitution of another unit.

While the tool shown is a grinding wheel it will be readily understood that a revolving milling cutter or the like could be mounted on the spindle 100. Also where no rotation of the tool is desired the sleeve 102 could receive a suitably shaped stationary tool.

In order that the grinding wheel may be adjusted vertically with relation to the hob, the sleeve 102 in which the tool unit is clamped is pivoted to swing about a horizontal axis. Referring to Figs. 13 and 15 it will be observed that the clamp 108 has a body portion 111 on which is formed a pair of arcuate ribs 112 that fit into a corresponding pair of arcuate slots 113 in the vertical portion of an angular bracket 114. The horizontal portion of this bracket is fixed to a horizontal plate 115 (Fig. 7) by a bolt 116 and a dowel pin 117. The clamp 108 is held in its adjusted positions in the arcuate slots 113 by means of a bolt 118 (Fig. 13) screw threaded into the clamp and passing through a slot 119 (Fig. 15) in the bracket 114. By referring to Fig. 15 it will be clear that the clamp 108 together with the tool unit can be adjusted in the arcuate slots 113 to swing the grinding wheel spindle about a horizontal axis.

It is also desirable to be able to adjust the grinding wheel spindle horizontally about a vertical axis and in order that this may be done the plate 115 to which the bracket 114 supporting the grinding wheel unit is fixed, is made adjustable about a vertical axis by being pivoted at 120 (Fig. 6) to another plate 121 (Fig. 5), the pivot being toward the rear of the plate 115. The plate 115 can be clamped in various angular positions by means of clamps 122 having bolts 123 extending through arcuate slots 124 in the plate 115 and screw threaded into the plate 121. By adjusting the plate 115 about its pivot 120 the grinding wheel spindle can be swung about a vertical axis so that the grinding face of the wheel can be brought into proper position with relation to the teeth to be ground.

As previously mentioned, it is desirable to grind both side faces of the hob teeth. In Fig. 7 the grinding wheel 51 is positioned so as to grind one face. If the opposite faces of the teeth are to be ground the grinding wheel spindle must be positioned so that the grinding face of the wheel is parallel to the faces to be ground. For this purpose a second bracket 114 is fixed to the plate 115 to receive a grinding wheel unit, this bracket being shown without a tool unit in it (Fig. 7). After a number of hobs have been ground on one side, the grinding wheel unit is removed from its clamp 108, positioned in the clamp of the second bracket 114, or a new grinding wheel unit is mounted on the second bracket, and the machine is adjusted to grind the other side of the hob teeth.

The plate 121 upon which the plate 115 is pivoted can be manually adjusted to move the grinding wheel 51 to and from the work. The plate 121 is slidably mounted on another plate 125 (Figs. 18 and 19), the plate 125 having a rib 126 on it fitting into an undercut recess 127 in plate 121. Plate 121 is moved forward and backward on plate 125 by means of a hand wheel 128 (Fig. 18) that operates a rotatable screw 129 (Figs. 18 and 19) fixed against longitudinal movement relative to plate 125 and passing through a threaded opening in a projection 130 on the plate 121. This manual adjustment enables the tool to be moved to and from the work for purposes of adjustment and in cases where the automatic movement of the tool is not desired.

An important advantage of the grinding wheel unit construction and its mounting is that the unit can be removed from the clamp without disturbing the adjustment of the clamp or the parts supporting it. This is very convenient, particularly when grinding both sides of hob teeth because the plate 115 and the clamp 108 can be adjusted about their respective axes and tightened in position. The grinding wheel units can then be inserted and removed from the clamp 108 at will without disturbing the adjusted position of the clamp. This speeds up the work as against machines that require all these adjustments to be made over again when a grinding wheel unit is changed.

From the description of the tool support thus given it will be noted that the tool spindle can be adjusted about a horizontal axis to position the grinding wheel above and below the axis of the hob; that the spindle can be adjusted about a vertical axis to swing the wheel into proper position relative to the side faces of the teeth; that the wheel can be moved manually to and from the work; and that the grinding wheel unit can be removed and replaced without disturbing the adjustments.

*Automatic reciprocation of tool*

As previously mentioned, it is necessary, in operating on a piece of work such as a hob, to gradually move the tool toward the work and then suddenly retract it, the gradual movement being for the purpose of providing relief on the cutting teeth and the sudden movement being to get the tool out of the way of the next tooth as the work rotates. Automatic means has been provided for accomplishing this result, such means being operated in timed relation to the rotation of the work spindle.

Figure 19:
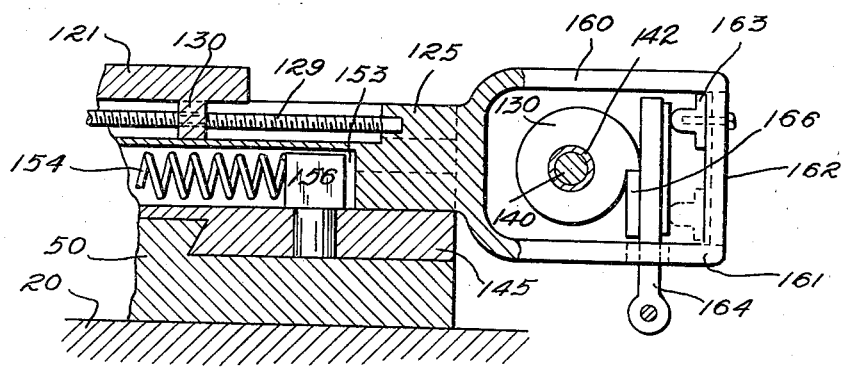
Fig. 19 is a vertical sectional view taken as on the line 19—19 of Fig. 6 and illustrating the construction of the reciprocating cam.

The tool is automatically moved to and from the work under the control of a snail cam 130 illustrated in Fig. 19 which cam is driven through reduction gears from the work spindle 23 as follows:

Referring to Fig. 5 the work spindle 23 has fixed to it a gear 131 that meshes with a gear 132 (Fig. 9). Fixed to the gear 132 and rotating with it is a larger gear 133 which, in turn, meshes with a gear 134 fixed to a shaft 135. The shaft 135 extends longitudinally of the machine on the rear side thereof as illustrated in Fig. 6 and, at its opposite end, it carries a gear 136. The gear 136 meshes with a smaller gear 137 (Fig. 12) which is fixed to rotate with a larger gear 138 which meshes with a gear 139 on a shaft 140. The shaft 140 extends longitudinally of the machine (Fig. 6) and is splined to a clutch 141 (Fig. 16), the details of which will be later explained.

The clutch 141 drives a hollow shaft 142 to which the snail cam 130 is fixed, the shaft being journaled in bearings 143 and 144 extending rearward from a plate 145 (Fig. 18) on the tool carriage. The bearings thus move longitudinally with the tool carriage and carry the cam 130 and clutch 141 with them, relative longitudinal movement between the clutch 141 and shaft 140 being permitted by the splined connection between them. The shaft 142 is held against movement through bearings 143 and 144 by a flange 146 on the shaft (Fig. 16) and a threaded nut 147. The cam 130 is secured to the shaft 142 by means of a clamping nut 148 (Fig. 16) which clamps the cam against the flange 146. This mounting permits the cam to be easily removed and replaced by another of different contour.

In order that the grinding wheel may automatically move to and from the hob, the plate 125 carrying the devices that support it (Fig. 18) is slidably mounted on the tool carriage plate 145. It will be recalled that plate 125 carries the manually adjustable plate 121, on which is mounted the pivoted plate 115 carrying the grinding wheel bracket 114. The plate 125 is provided with a rib 150 (Fig. 5) fitting into a complementary slot 151 on the plate 145. The plate 125 is also provided with a recess 153 (Fig. 16) in which is located a spring 154 that bears at its left hand end in Fig. 18 against a threaded stud 155 in the plate 125 and at its right hand end against a vertical stud 156 projecting up from the plate 145. The spring serves to urge the plate 125 to the left as viewed in Fig. 16, that is, the grinding wheel is normally urged away from the hob.

Figure 18:
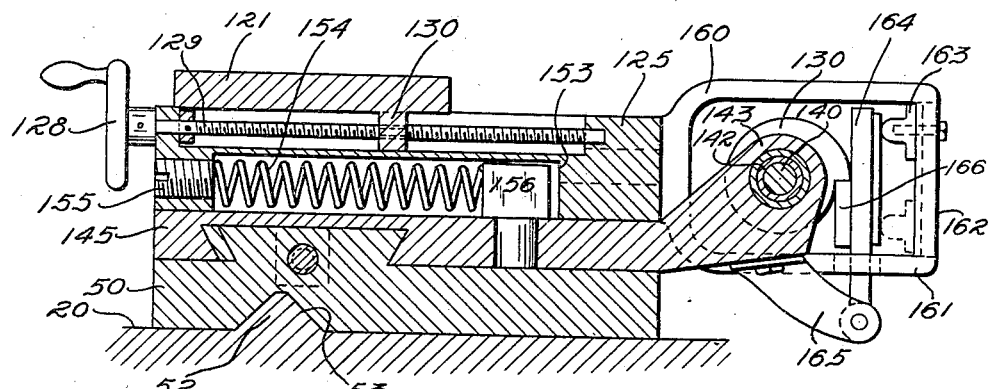
Fig. 18 is a vertical sectional view taken as on the line 18—18 of Fig. 6.

The plate 125 has a yoke-like extension comprising two arms 160 and 161 whose outer ends are joined by a connecting piece 162. Mounted on the connecting piece 162 is a vertically adjustable abutment 163 against which a pivoted arm 164 is adapted to bear. This arm is pivoted to a projecting portion 165 of the bearing 143 (Figs. 16 and 18). The arm 164 carries a tappet plate 166 against which the snail cam 130 operates. As the cam rotates counterclockwise as viewed in Fig. 18, it contacts the tappet plate 166 and gradually swings the arm 164 clockwise. The arm, through its engagement with the abutment 163, moves the yoke arms 160—161 and the plate 125 to the right as viewed in Fig. 18 against the tension of the spring 154. This movement continues until the high point of cam 130 passes the edge of tappet plate 166 whereupon the arm 164 is released and the spring 154 acts to suddenly snap the plate 125 to the left to withdraw the grinding wheel from the hob. This action is repeated as the machine continues to operate.

The speed with which the cam moves the grinding wheel toward the work depends, of course, upon the contour of the cam and the rapidity of its rotation. The distance the wheel is moved also depends upon the cam contour. If wide variations are desired cams of different contour may be used but a reasonable adjustment can be secured by changing the position of the abutment 163 to vary the lever action of arm 164, this type of adjustment being very old in the machine tool art.

The clutch 141 through which the cam 130 is driven is a one-way clutch whose construction and function are as follows:

The hollow shaft 142 to which the cam 130 is fixed is keyed to a circular plate 170 (Fig. 16). This plate abuts a circular clutch disc 171, the plate and the disc being connected together by means of bolts 172. The heads of these bolts operate in undercut annular recesses 173 in the clutch disc 171 and the nuts 174 bear against the plate 170. This connection permits the plate 170 to be angularly adjusted relative to the clutch disc 171 by loosening the nuts 172, moving the plate 170 to the desired position, and tightening the nuts again.

Pivotally mounted in a recess 175 in the clutch disc 171 is a dog 176 (Fig. 17) urged by a spring 177 into engagement with the periphery of a single toothed ratchet disc 178 which is splined to the shaft 140, the disc 178 being positioned in a circular recess 179 in disc 171 (Fig. 16). The disc 178 is held to the clutch disc 171 by means of an annular plate 180 (Fig. 16) that is bolted in position, the thickness of the dog 176 being slightly less than that of the ratchet disc 178 so that, while the dog is held between the annular plate 180 and disc 171, it can move freely.

This construction permits the work spindle to be reversed to cause the tool carriage to be returned longitudinally to its original position without causing the tool to move to and from the work. Also such movement can be obtained without disturbing the adjustment of the machine as will be later explained in more detail.

Manual adjustment of the grinding wheel longitudinally of the tool carriage is made possible by mounting the plate 145 for longitudinal movement on carriage 50 (Fig. 5), the adjustment being effected by means of a screw 181.

Operation

In order that the operation of the machine may be clear, a typical operation in hob grinding will be described:

The lead bar 62 is carefully adjusted so that it will move the tool carriage longitudinally at exactly the correct speed for the lead of the teeth of the hobs as they are rotated by the work spindle. The angularity of the lead bar can be easily determined since the lead of the hobs is known and the vertical movement of the lead bar per revolution of the work spindle may be secured for the ratio of gears used between the work spindle and the lead bar carriage. The lead bar can then be adjusted so as to cause the tool carriage to move in accurate relation to the theoretically correct lead of the work. As previously explained this adjustment can be made very fine and, on account of the accuracy with which the lead bar can be made and the elimination of lost motion in the driving connections, the longitudinal movement of the tool carriage will be extremely accurate.

A hob 10 mounted on its arbor 25 is then positioned in the work support so as to be driven by the work spindle 23.

The grinding wheel 51 is then adjusted to the proper angle to contact the face of the teeth. This is done by adjusting the plate 115 about its pivot 120 and by adjusting the clamp 108 in the arcuate slots 119 of bracket 114, adjustments about both a vertical and a horizontal axis being thus obtained. In practice the line of contact of the grinding wheel with the work is above or below the axis of the hob.

A cam 130 of the proper contour to move the tool to and from the work to give the proper relief is assumed to be in the machine. If finer adjustment is needed, the abutment 163 is adjusted to give this result. In order to set the cam 130 in proper angular position to move the tool to and from the hob in proper timed relation to the position of the teeth the nuts 174 (Fig. 16) are loosened so that, by turning the plate 170 the cam 130 can be moved relative to the driving clutch. The plate 170 is turned counter clockwise by hand until the high point of the cam just passes out of contact with the tappet plate 166 which permits the tool to move away from the work. The nuts 174 are then tightened to lock the plate 170 to the clutch disc 171 and the machine is ready for operation.

The machine is then started which causes the hob to rotate, the lead bar carriage to move downwardly, the tool carriage to move longitudinally to the right, and the grinding wheel to move toward the work. These parts are all timed as previously explained so that the tool carriage moves longitudinally in accurate relation to the lead of the hob teeth, and the grinding wheel is gradually moved inwardly to grind the surface of the tooth to the bottom of the groove and/or to provide the proper "relief". As the rear of each tooth is reached the high point of the cam 130 passes the tappet plate 166 whereupon the grinding wheel is suddenly withdrawn from the hob and out of the way of the next tooth. These operations continue automatically until all the teeth of the hob are ground on one side.

After one hob is ground another is put in position and its teeth are ground on the same side as the first hob, this operation continuing for a given batch of hobs. In order to prepare for the second hob the tool carriage must be returned to the left. This is accomplished by reversing the driving clutch by means of lever 43 (Fig. 12). This reverses the rotation of the gears that move the lead bar carriage.

The lead bar carriage then moves upward and the lead bar returns the tool carriage to the left. During this reversal the driving connections for the cam 130 are also reversed but this reverse movement is not transmitted to the cam because the dog 176 of the one way clutch of Fig. 17 merely rides on the periphery of disc 178, the disc being rotated clockwise as viewed in Fig. 17. Consequently, during the return of the tool carriage the grinding wheel remains out of contact with the work. This construction also keeps the cam 130 in proper adjustment relative to the hob teeth because the one-tooth clutch always picks up the cam shaft in the same angular relationship.

After the teeth of a batch of hobs have been ground on one side a grinding wheel unit is placed in the opposite clamping member 108 (Fig. 7) and the machine adjusted as before but this time the grinding wheel is adjusted to grind on the opposite faces of the teeth. The batch of hobs is then run through again until all the faces have been ground on the second side.

The combination of elements disclosed has proven, in use, to operate very efficiently and to enable hobs to be ground very rapidly and accurately.

When the machine is used for grinding taps or milling cutters the operation is substantially the same as that above described except that grinding wheels of different size or shape are used, the shape of the grinding wheel being varied to suit the requirements.

The machine may likewise be used for cutting hobs, taps or milling cutters in which event a tool unit is substituted that constitutes either a rotating milling cutter or a plain cutting tool which does not rotate.

When the machine is used for grinding or cutting worms the automatic mechanism for moving the tool to and from the work is disabled. This may be easily done by removing one of the driving gears in the driving connection between the work spindle and the cam that operates to automatically move the tool to and from the work. When the end of the worm is reached the tool can be moved away from the work by hand so that the tool carriage can be returned.

An important point to be noted in connection with this machine is that the lead bar 62 can be adjusted so that it inclines either to the right or left of the vertical so that downward movement of the lead bar will move the tool carriage either to the right or to the left as viewed in Fig. 5. In setting the machine for left hand teeth or threads the lead bar is positioned so that, as it moves downward, it will move the tool carriage to the right as viewed in Fig. 5. However, when it is desired to operate on right hand teeth or threads the lead bar can be swung counter-clockwise from the position of Fig. 5 past the vertical and, with the lead bar so adjusted, downward movement of it will move the tool carriage to the left as viewed in Fig. 5. Another advantage to be observed is that the counterweight keeps the driving gears tight when the machine is operating on both right and left hand teeth or threads.

It is to be understood that the structure shown is for purposes of illustration and that variations may be made in it without departing from the spirit and scope of the appended claims.

I claim:

1. An automatic hob grinder having a rotatable hub support, power operated means for rotating said support, a tool carriage, said tool carriage and hob support being capable of relative longitudinal movement, a grinding wheel on said carriage, means causing relative approaching and receding movement between said grinding wheel and hob support several times during each rotation of said hob support and in timed relation to the rotation of said support, a second carriage movable transversely to the direction of relative movement between said hob support and tool carriage, means moving said second carriage in timed relation to the rotation of said hob support, and reciprocating mechanism operated directly by movement of said second carriage acting to cause the total relative longitudinal movement between said hob support and tool carriage in timed relation to the rotation of said hob support, and in accordance with and equal to the lead of the hob being ground.

2. In a machine of the class described, a rotatable work support, a tool carriage movable longitudinally relative to said work support, a tool holder on said carriage, a second carriage movable transversely to the path of said tool carriage, connections between said rotatable work support and said second carriage causing them to move in timed relation, means connecting said second carriage with said tool carriage to move the latter longitudinally in proportion to the movement of said second carriage, and means causing a relative approaching and receding movement between said tool holder and said work support several times during each rotation of said work support and, in timed relation to the rotation of said work support.

3. In a machine of the class described, a horizontally positioned rotatable hob support, a tool carriage movable longitudinally relative to said hob support, a vertically slidable carriage, gearing connections for moving said carriage in timed relation to said hob support, a weight counterbalancing said carriage, said weight slightly overbalancing said carriage to urge it upwardly and connections between said vertical and said longitudinal carriages to move the longitudinal carriage longitudinally when the vertical carriage is moved vertically.

4. An automatic hob grinder having a hob supporting means adapted to rotatably support a hob to be ground, power operated means for rotating said hob supporting means, a carriage carrying a rotatable grinding wheel, said carriage and hob supporting means being capable of relative longitudinal movement, a lead bar moved in timed relation to the rotation of said hob supporting means, means moved solely by said lead bar causing the total relative longitudinal movement between said hob supporting means and said carriage in accordance with and equal to the lead of the hob to be ground, and means causing relative approaching and receding movements between said grinding wheel and said hob supporting means several times during each rotation of said hob supporting means and in timed relation to the rotation of said hob supporting means.

5. A hob grinder having a rotatable hob support adapted to support a hob, power operated means for rotating said support, a longitudinally movable tool carriage supporting a grinding wheel, a lead bar moved in timed relation to the rotation of said hob support and connected to said tool carriage to move the same longitudinally relative to said hob, and means moving said grinding wheel to and from the hob support several times during each rotation of said support and in timed relation to the rotation of said hob support.

6. In a machine of the class described, a rotatable work support, a tool carriage movable longitudinally relative to said work support, a transversely movable tool holder on said carriage, a second carriage movable substantially at right angles to the path of movement of said tool carriage, connections between said rotatable work support and said second carriage causing them to move in timed relation, a lead bar mounted on said second carriage so that it may be positioned at different angles to the direction of movement of said second carriage, connections between said lead bar and said tool carriage acting to move the latter longitudinally as said second carriage is moved, and means moving said tool transversely to and from the work support several times during each rotation of said work support and in timed relation to the rotation of said work support.

7. In a machine of the class described, a rotatable work support adapted to support a piece of work, a tool carriage movable horizontally and in a longitudinal direction relative to said work support, a transversely movable tool holder on said carriage, a lead bar movable vertically under control of said rotatable work support so as to move in timed relation with the latter, connections between said lead bar and the tool carriage acting to move the tool carriage longitudinally relative to said work as the lead bar is moved, and means driven in timed relation to the rotation of said work support acting to move said tool holder to and from the work support.

8. An automatic hob grinder having a rotatable hob support, power operated means for rotating said support, a tool carriage movable longitudinally relative to said support, a grinding wheel mounted on said carriage for transverse movement relative to the hob support, a lead bar carriage movable vertically and transversely relative to the movement of the tool carriage, means urging said lead bar carriage upwardly, connections between said work support and lead bar carriage including a rack and pinion acting to control the movement of the lead bar carriage from the work support, a lead bar on said lead bar carriage, connections between the lead bar and tool carriage for moving the latter, and means driven by the hob support for moving the grinding wheel to and from the hob in timed relation to the rotation of the hob.

9. An automatic hob grinder having a rotatable hob support, power operated means for rotating said support, a tool carriage, said tool carriage and hob support being capable of relative longitudinal movement, a grinding wheel on said carriage, means causing relative approaching and receding movement between said grinding wheel and hob support several times during each rotation of said hob support and in timed relation to the rotation of said hob support, and a sine bar operatively connected with said rotatable hob support to move in timed relation to rotation of the latter, said sine bar alone causing relative longitudinal movement between said hob support and said tool carriage in accordance with and equal to the lead of the hob being ground.

10. In a machine of the class described, a horizontally positioned rotatable hob support, a tool carriage movable longitudinally relative to said hob support, a vertically movable carriage, a sine bar carried by said vertically movable carriage, connections between said sine bar and said longitudinally movable carriage to cause the latter to be moved longitudinally when the former is moved vertically, a weight counterbalancing said vertical carriage, said weight being slightly greater than that of the carriage to urge the latter upwardly at all times, a rack on said carriage, and gearing mechanism meshing with said rack and with the driving means for said hob support to cause the rack and its carriage to be moved in timed relation with the rotation of the work support.

11. An automatic hob grinder having a horizontally positioned rotatable hob support, power operated means for rotating said support, a vertically movable carriage, means for counterbalancing said carriage, said counterbalancing means slightly overbalancing said carriage, a rack on said carriage, a gear meshing with said rack, said gear being in driving relation with said hob support, a tool carriage movable longitudinally relative to said hob support, a sine bar on said vertically movable carriage, connections between said sine bar and said longitudinally movable carriage for causing the latter to move longitudinally when the sine bar moves vertically, a grinding wheel support on said tool carriage, and means for moving said grinding wheel support to and from said hob support.

12. In a machine of the class described, a pair of carriages movable angularly with respect to each other, means for rotatably supporting a piece of work with its axis approximately parallel to the path of movement of one of said carriages, a tool carried by said last mentioned carriage, means moving said tool carriage in predetermined relation with respect to the movement of the other carriage comprising a lead bar supported on and bodily movable with said other carriage, said lead bar being positioned with its axis at an angle to the path of movement of said other carriage, a sliding collar on said bar, a connection between said collar and said tool carriage, means rotating said work supporting means in predetermined timed relation with respect to movement of said other carriage, and means for reciprocating said tool in a direction transverse to the path of movement of said tool carriage and in timed relation with respect to the rotation of said work supporting means.

13. In a machine of the class described, a rotatable work support, power operated means for rotating said support, a tool carriage slidable longitudinally relative to said work support, a vertically movable carriage supporting a sine bar, driving means for moving said vertical carriage in timed relation to the rotation of said work support, a collar on said sine bar, a slide connected to said collar, means for supporting said slide for movement in a path exactly 90° from the path of movement of said sine bar, and a universal connection between said slide and said tool carriage.

14. An automatic hob grinder having a rotatable hob support, power operated means for rotating said support, a longitudinally movable carriage supporting a rotatable grinding wheel, means causing relative approaching and receding movements between said grinding wheel and hob support several times during each rotation of said hob support and in timed relation to the rotation of said support, and means moving said carriage longitudinally relative to said work support and in timed relation to the rotation of said support, said last-named means being adjustable to enable said carriage to be moved in opposite directions while the work support rotates in the same direction.

15. An automatic hob grinder having a rotatable hob support, power means for rotating said support, a longitudinally movable carriage supporting a rotatable grinding wheel, means causing relative appoaching and receding movements between said grinding wheel and hob support several times during each rotation of said hob support and in timed relation to the rotation of said support, a lead bar moved in timed relation to the rotation of said hob support, and connections between said lead bar and carriage for moving the latter longitudinally as the lead bar is moved, said lead bar being adjustable to cause said carriage to move in either of two opposite directions while said hob support rotates in the same direction.

16. In a machine of the class described, a rotatable work support, means for rotating said support, a tool carriage, mechanism causing relative longitudinal movement between said work support and carriage in timed relation to the rotation of the work support, said mechanism being adjustable to cause relative longitudinal movement to be obtained in either one of two directions while the work support rotates in the same direction, and means preventing lost motion in said driving mechanism while it causes said relative movement in either direction.

17. A hob grinder having means for rotatably supporting a hob, a tool carriage movable longitudinally relative to the hob, a grinding wheel supported for transverse movement on said tool carriage, a lead bar carriage having a lead bar connected to said tool carriage to move the latter longitudinally, mechanism between the hob support and lead bar carriage for causing the movement of the lead bar carriage to be in timed relation to the rotation of the hob, means urging the lead bar carriage in a direction to move the tool carriage longitudinally against the holding action of the gears, and means driven in timed relation to the rotation of the work support for moving the grinding wheel to and from the hob.

18. A hob grinder having a rotatable hob support, a tool carriage, means for causing relative longitudinal movement between the carriage and the hob support in timed relation to the rotation of the hob support, a grinding wheel support on said carriage including means for detachably receiving and supporting a grinding wheel unit at one side of a vertical plane perpendicular to the hob axis with the axis of said unit oblique to the hob axis, said grinding wheel support being adjustable about an axis horizontal with respect to the base of the machine and substantially at right angles to the axis of said unit, a second and separate grinding wheel support on said carriage including means for detachably receiving and supporting said grinding wheel unit on the opposite side of said vertical plane with the axis of said unit oblique to the hob axis, said means on said second grinding wheel support being adjustable about an axis horizontal with respect to the base of the machine and at right angles to the axis of the grinding wheel unit when the latter is in said support, and means for causing relative approaching and receding movements between said grinding wheel unit and said hob support in timed relation to the relation of the hob support and a plurality of times during each revolution of said hob support.

19. In a hob grinder of the class described, a tool carriage, a plate on said carriage adjustable about a vertical axis, a grinding wheel support fixed to said plate and provided with means adapted to detachably receive and support a grinding wheel unit on one side of a vertical plane perpendicular to the hob axis with the axis of said unit oblique to the hob axis, said means for supporting said grinding wheel unit being adjustable about a horizontal axis substantially at right angles to the axis of the grinding wheel unit, a second and separate grinding wheel support fixed to said plate and provided with means adapted to detachably receive and support said grinding wheel unit on the opposite side of said vertical plane with the axis of said unit oblique to the hob axis, said means of said second grinding wheel support being also adjustable about a horizontal axis substantially at right angles to the axis of the grinding wheel unit when said unit is in said support.

20. In a hob grinder of the class described, a carriage, a plate on said carriage adjustable about a vertical axis, a grinding wheel support fixed to said plate, said grinding wheel support having a clamp adapted to detachably receive and support a grinding wheel unit with the unit on one side of a vertical plane substantially perpendicular to the hob axis and with the axis of said unit oblique to the hob axis, said clamp being adjustable about a horizontal axis at right angles to the axis of the grinding wheel unit, and a second and separate grinding wheel support fixed to said plate and provided with a clamp adapted to detachably receive and support said grinding wheel unit on the opposite side of said vertical plane with the axis of the unit oblique to the hob axis, said clamp on said second support being adjustable about a horizontal axis at right angles to the axis of the grinding wheel unit when supported by said clamp.

JOSEPH C. DRADER.